May 24, 1955 E. F. BRITTEN III 2,708,820
ANTI-TANGLE CUTTER FOR GRASS TRIMMERS
Filed April 5, 1954
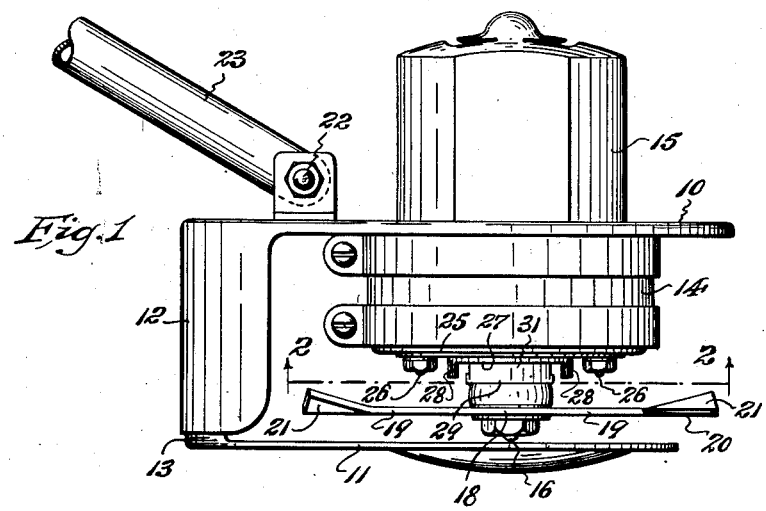
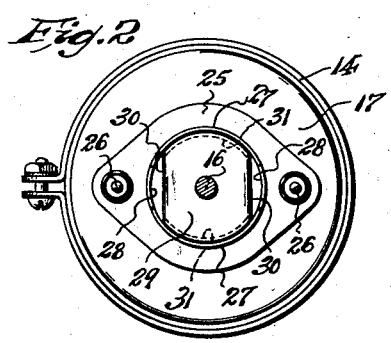
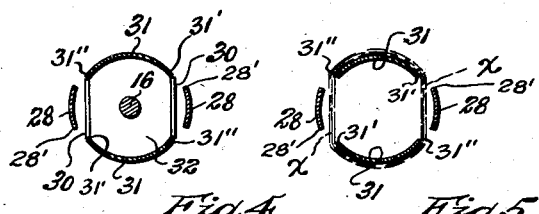
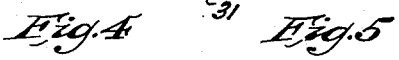
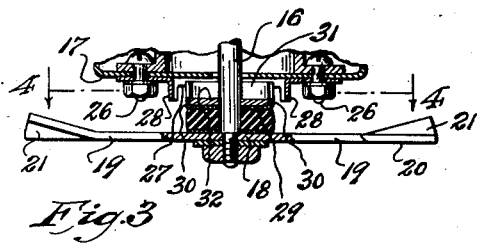
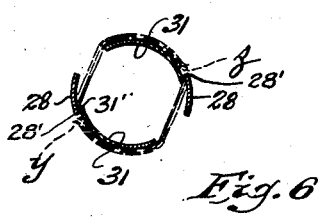
INVENTOR.
Edwin F. Britten III,
BY
Attorney

United States Patent Office 2,708,820
Patented May 24, 1955

2,708,820

ANTI-TANGLE CUTTER FOR GRASS TRIMMERS

Edwin F. Britten III, Short Hills, N. J.

Application April 5, 1954, Serial No. 421,028

4 Claims. (Cl. 56—25.4)

This invention relates to improvements in grass trimmers such as used for trimming grass adjacent to walls, curbs, around trees and monuments, and in other areas which are not accessible to ordinary lawn mower devices.

A grass trimmer for the above stated uses generally comprises a carriage frame formed by a top plate and a bottom skid plate, and supported by said carriage frame is a power driven rotary cutting blade, said cutting blade rotating in a horizontal plane intermediate said top plate and bottom skid plate adjacent to the latter. One problem incidental to the use of a grass trimmer of this type, is the tendency of long pieces of grass, weed stems and other tall growth to be engaged by the drive shaft of the cutting blade so as to wind about the same in wrapped entanglement thereon. As such wrapped entanglement of grass and the like accumulates, it tends to impede rotation of the drive shaft with a slowing down effect, thereby increasing the load on the power unit with risk of causing the same to overheat to the detriment thereof. When such wrapped entanglement of grass or the like occurs, it necessitates stopping operation of the trimmer, so that the operator, by laborious hand labor, can cut away the wrapped entanglement, whereby to free the cutting blade drive shaft from the resistance thereof.

It is an object of this invention to provide a solution of the above stated problem, and to this end to provide a novel anti-tangle cutter means which will automatically cut away any grass or the like which tends to wrap itself about the cutting blade power shaft, whereby to prevent accumulation of such wrapped entanglement, and thereby free the power transmission therefrom so that impedance of normal rotation of the main cutting blade is avoided, and the trimmer can be operated at maximum efficiency without interruption.

The above and other objects will be understood from a reading of the following detailed description of the present invention in connection with the accompanying drawings showing an illustrative embodiment thereof, in which:

Fig. 1 is a side elevational view of a grass trimmer equipped with the anti-tangle cutter means according to this invention; Fig. 2 is a fragmentary horizontal sectional view, taken on line 2—2 in Fig. 1; Fig. 3 is a fragmentary elevational view of the anti-tangle cutter means with parts broken away and shown in section; and Fig. 4 is a fragmentary horizontal sectional view through the anti-tangle cutter means, taken on line 4—4 in Fig. 3.

Fig. 5 is a schematic horizontal sectional view similar to Fig. 4 through the stationary and rotary knife elements of the anti-tangle cutter means, as relatively disposed preparatory to cutting cooperation; and Fig. 6 is a sectional view similar to Fig. 5 with said knife elements cooperating to effect a cutting action.

Similar characters of reference are employed in the above described views, to indicate corresponding parts.

Referring to the drawings, an illustrative type of grass trimmer shown therein comprises a carriage frame formed by a top plate 10 and a bottom or skid plate 11 disposed in axial alignment with said top plate in parallel downwardly spaced relation thereto. The top plate and bottom or skid plate can be connected together by any suitable means. As shown, by way of illustration, the top plate is provided at its rear end with a dependent back flange 12, and the bottom or skid plate is provided with an upstanding back flange 13 which laps the back flange 12 of the top plate, and which is fixedly secured to the latter in any suitable manner. The top plate 10 is constructed to support a power unit by which the main cutting blade of the grass trimmer is actuated. To this end, said top plate is provided with a centrally located, upwardly open well portion 14 dependent therefrom in which the power unit is mounted. As shown, the power unit comprises an electric motor 15. The armature shaft 16 of said motor 15 projects through the bottom member 17 of the well portion 14 toward the inner face of the bottom or skid plate 11 of the carriage frame. Suitably fixed on the projecting portion of said shaft 16 is the main cutting blade of the grass trimmer. In a preferred form thereof, said main cutting blade comprises a transversely extending blade body 18, disposed in a plane parallel to and adjacently above the inner face of the bottom or skid plate of the carriage frame. The blade body 18 provides oppositely extending blade arms 19, the end portions of which each terminate in sharpened cutting edge portions 20 disposed to extend along the leading side margin thereof, and in upward, angular pitched fan sections 21, disposed to extend along the trailing side margin thereof. The bottom or skid plate 11 is of a radius less than the radial extent of the cutting blade arms 19, so that the effective cutting edge portions 20 of the latter project exteriorly beyond the periphery of said bottom or skid plate, whereby to make mowing contact with grass over which the grass trimmer is moved in use.

Pivotally connected with the rear end portion of the top plate 10, by a pivotal connection 22, is a handle shaft 23 by means of which the grass trimmer can be manipulated in use.

The anti-tangle cutter means comprises an external stationary cutter member and an internal rotary cutter member. The stationary cutter member comprises a centrally open base plate 25 which is affixed to the external face of the bottom member 17 of the carriage frame well portion 14, as by fastening bolts 26. The central opening of said base plate 25 is disposed concentric to and so as to surround the drive shaft 16. Dependent from the margin of said central opening of the base plate 25 is an annular guard flange or lip 27. Formed integral with said guard flange or lip 27, respectively at diametrically opposite sides thereof, to depend therefrom, are stationary segmental knife elements 28. The rotary cutter member comprises a body 29 of oblongitudinal shape in plan, thus providing straight or flat sides 30 bounding its width or minor diameter, and upstanding segmental knife elements 31 bounding its length or major diameter. The body 29 of the rotary cutter member is preferably reenforced by an inlay 32 which is suitably affixed therein. The rotary cutter member is suitably affixed to the drive shaft 16 so as to be rotated thereby relative to the stationary cutter member. The external major diameter of the rotary cutter member substantially corresponds to the internal diameter of the stationary cutter member, and said rotary cutter member is so positioned on the drive shaft 16 relative to the stationary cutter member that the top edge portions of the knife elements 31 of the former revolve within the annular guard flange or lip 27 of the latter. By reason of this, the rotary cutter member telescopes somewhat into the interior of the stationary cutter member, so that long grass or other long growth, in winding about the rotary cutter member, can not pass upwardly beyond the guard flange or lip 27 and into the interior of the anti-tangle cutting means so as to gain access to the drive shaft 16 within the latter. The leading vertical side edges 31' of the knife elements 31, during rotation of the rotary cutter member, are moved past vertical side edges 28' of the knife elements 28 of the stationary cutter member to effect cooperative shearing action therewith.

In operation of the grass trimmer, as the main cutting blade 18 is rotated by the drive shaft 16, if any long grass or other long growth works into the interior of the grass trimmer above the main cutting blade, it will encounter the rotary cutter member with tendency to wind and wrap around the same. Owing however to the oblongitudinal shape of the rotary cutter member, any grass or other growth tending to wind and wrap around the same will bridge across the sides of said rotary cutter member in straight extension between the leading vertical edges 31' and the trailing vertical edges 31" of its opposite upstanding knife elements 31, as indicated at x in Fig. 5, and will thus be disposed between effective cutting edges 31' of said rotary cutter knife elements 31 and the cutting edges 28' of the stationary cutter member knife elements 28. The grass or other growth being thus interposed between effective cutting edges 28' and 31' of said knife elements 28 and 31, as said cutting edges meet and pass one another, the same will shear through the bridging grass or other growth, thus parting the latter at two opposite points, as indicated at y and z in Fig. 6. When the grass or other growth is thus severed, the separated parts thereof will quickly be thrown off and away from the anti-tangle cutter means by centrifugal force, so as to readily escape from the interior of the grass trimmer.

From the above it will now be obvious that the novel anti-tangle cutter means of this invention will effectively prevent entangled wrapped accumulation of long grass or other long growth upon and about the power shaft of a grass trimmer, so that the grass trimmer, in use, is assured of unimpeded and uninterrupted operation.

Having now described my invention, I claim:

1. In a grass trimmer having a carriage frame, a rotary main cutting blade and a power driven shaft for rotating the latter, an anti-tangle cutter means comprising an external stationary cutter member supported in connection with the carriage frame above the main cutting blade and concentric to the power driven shaft, and an internal rotary cutter member entered in said stationary cutter member, said rotary cutter member being fixed on said shaft so as to be driven thereby in cooperative relation to said stationary cutter member.

2. In a grass trimmer having a carriage frame, a rotary main cutting blade and a power driven shaft for rotating the latter, an anti-tangle cutter means comprising a stationary cutter member supported in connection with said carriage frame above the main cutting blade, said stationary cutter member having a dependent annular guard flange concentric to the power driven shaft and circumferentially spaced knife elements dependent from said guard flange, and a rotary cutter member fixed on said shaft so as to be driven thereby, said rotary cutter member having circumferentially spaced upstanding knife elements extending into the stationary cutter member for cooperation with the knife elements thereof, the upper end portions of said upstanding knife elements of the rotary cutter member lapping the guard flange of the stationary cutter member so as to be embraced thereby.

3. In a grass trimmer having a carriage frame, a rotary main cutting blade and a power driven shaft for rotating the latter, an anti-tangle cutter means comprising an external stationary cutter member supported in connection with the carriage frame above the main cutting blade and concentric to the power driven shaft and provided with diametrically opposite dependent knife elements, and an internal oblongitudinal rotary cutter member entered in said stationary cutter member, said rotary cutter member being fixed on said shaft so as to be driven thereby and provided at its opposite ends with upstanding knife elements extending into the stationary cutter member for cooperation with the dependent knife elements of the latter.

4. In a grass trimmer having a carriage frame, a rotary main cutting blade and a power driven shaft for rotating the latter, an anti-tangle cutter means comprising a stationary cutter member supported in connection with the carrier frame, said stationary cutter member having a dependent annular guard flange concentric to the power driven shaft and diametrically opposite knife elements dependent from said guard flange, and a rotary cutter member of oblongitudinal shape fixed on said shaft so as to be driven thereby, said rotary cutter member having upstanding knife elements at its opposite ends to extend into the stationary cutter member, said latter knife elements having vertical cutting edges at their leading ends for cooperation with the dependent knife elements of said stationary cutter member, the upper end portions of said knife elements of the rotary cutter member lapping the guard flange of said stationary cutter member so as to be embraced thereby.

References Cited in the file of this patent

UNITED STATES PATENTS

| | | |
|---|---|---|
| 2,245,821 | Poynter | June 17, 1941 |
| 2,539,619 | Goodall | Jan. 30, 1951 |
| 2,551,817 | Taylor | May 8, 1951 |
| 2,564,586 | Smith et al. | Aug. 14, 1951 |
| 2,597,774 | Britten III | May 20, 1952 |